Aug. 1, 1944.  M. G. McGOWAN  2,354,978
MEANS FOR TEACHING TIME
Filed July 1, 1943  2 Sheets-Sheet 1
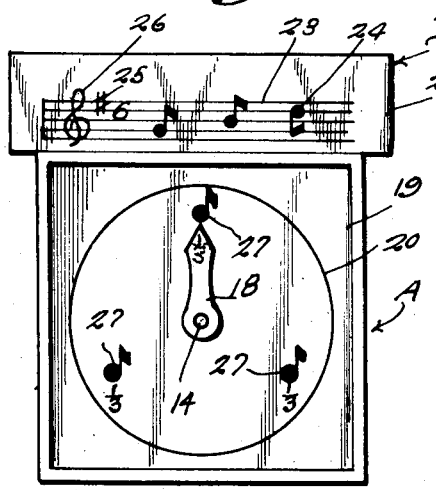
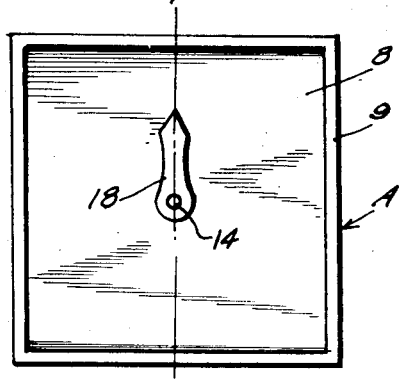
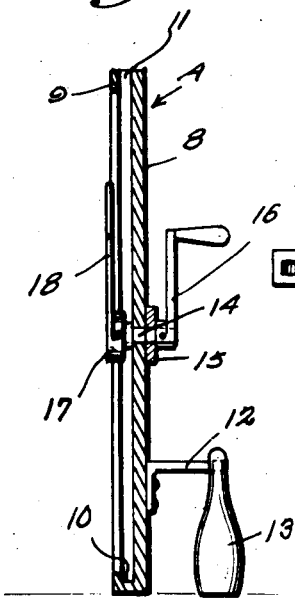
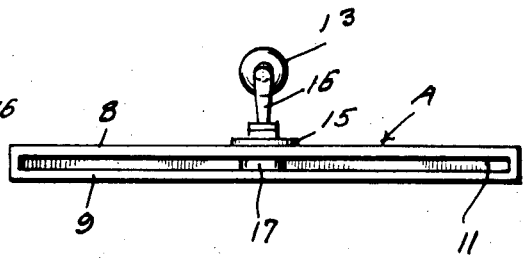
Inventor
Mary Gertrude McGowan
By Clarence A. O'Brien
and Harvey B. Jacobson
Attorneys Aug. 1, 1944.   M. G. McGOWAN   2,354,978
MEANS FOR TEACHING TIME
Filed July 1, 1943   2 Sheets-Sheet 2

Inventor
Mary Gertrude McGowan,
By Clarence A. O'Brien
and Harvey B. Jacobson
Attorneys Patented Aug. 1, 1944

2,354,978

UNITED STATES PATENT OFFICE 2,354,978

MEANS FOR TEACHING TIME

Mary Gertrude McGowan, Fall River, Mass.

Application July 1, 1943, Serial No. 493,095

2 Claims. (Cl. 84—484)

The present invention relates to a method and means of teaching of time in relation to musical notation symbols of predetermined standardized type, having reference more in particular to an arrangement which enables the observer to visualize time and to thus become familiar with various rhythm patterns.

An outstanding object of the invention has to do with the provision of a structure which applies to educational principles of leading systematically from known to unknown information; that is, from conventionally metered time as represented by the familiar clock dial or face to time in relation to musical symbols or notations.

Another aim is the provision of a simple and economical device which is adaptable either to individual or group teaching, an arrangement in which the arithmetic or time value of the beat is clearly "seen."

More specifically, the invention has to do with a holder for reception of a plurality of selectively usable charts wherein the notes are visible in normal position on a staff constituting a part of one of the charts, the amount of time given to each being clearly illustrated on the clock face portion of the chart.

As stated with greater particularity the invention, in its preferred embodiment, is characterized by a chart holding device, this having a frame forming a sight, the frame defining a pocket or receptacle for the chart, the structure being such as to accommodate a crank turned axle and a hand or pointer properly located to coact with the symbols on the dial portion of the chart.

Other features and advantages will become more readily apparent from the following description in the accompanying illustrative drawings.

In the drawings wherein like numerals are employed to designate like parts throughout the same:

Figure 1 is a front elevational view of a combination holder and chart arrangement constructed in accordance with the principles of the preferred embodiment of the invention.

Figure 2 is a view of the holder or chart adapter device with the chart removed.

Figure 3 is a top plan or edge showing of the arrangement depicted in Figure 2, the view being on a slightly larger scale.

Figure 4 is a central vertical section with parts in elevation, the section being on the plane of the line 4—4 of Figure 2.

Figure 8 is an elevational view of a slightly different or modified type of chart, this being adaptable for use in the classroom for drills in relation to fundamental facts in connection with arithmetic or drills for fractional and decimal equivalents and the like.

Figure 5:
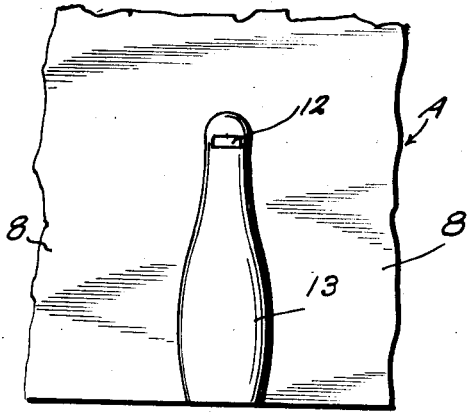
Figure 5 is a fragmentary enlarged elevational view of the handle means forming a preferred part of the chart holder.

The teaching of music in the elementary school resolves itself into two main problems: notation and rhythm (time). The obvious purpose of the device here disclosed is to solve the latter difficulty by "visualizing" time. It is based on the clock face, so that any child who can recognize the half-hour, the quarter-hour, twenty minutes past, and twenty minutes of, the hour, can be taught any rhythm in either simple or compound time.

The invention is made up essentially of two parts; namely, A the holding device or means and B the insertable and removable cardboard or equivalent chart. The holder A is constructed of wood, plastic or any other suitable light weight material and is of appropriate dimensions. In its preferred form it comprises a backing element 8 and a spaced parallel frame 9 of rectangular form. The frame defines a sight opening and also a pocket-like receiving channel 10, this to accommodate the panel portions of the selectively usable charts B. It will be noticed that the channel is closed at the bottom and along the two vertical edges and is open at the top to form an entrance slot as at 11 for the chart. On the rear of the backing element 8 is a suitable bracket 12 provided with a handle 13 resembling, in design, a bowling pin. This serves as a handle for holding the device, as a unit, and demonstrating the result. It also cooperates with the part A as a support or rest. This is brought out clearly in Figure 4 of the drawings. The central portion of the backing plate or element 8 is provided with an aperture to accommodate the journal portion of an axle 14. This is provided with a washer 15 abutting the backing plate and also provided outwardly of the washer with a crank handle 16. The hub portion 17 of the pointer or indicating arrow 18 is removably fitted over the axle so that the handle equipped axle and pointer can be separated to permit charts to be placed in position.

Structurally or fundamentally the charts are all the same, the variations being in the particular symbols printed thereon. Each chart comprises a rectangular panel portion 19, this having a circular ring 20 defining the clock dial or face, as it were. There is a central opening at 21 to slip over the axle. Then there is an enlarged head portion 22 at the top of the panel which provides shoulders and rests upon the holder at opposite ends of the slot portion 11 of the frame. This is to dispose the tell-tale 22 in a position to be clearly visualized independent of the clock dial. This tell-tale element 22 is provided with a fractional portion of a standard staff as indicated at 23 and being equipped with a note or symbol 24 on the lines of the staff, the signature at 25 and the cleff at 26. The equi-distant symbols representing eighth-notes are denoted by the numeral 27. These are in the area forming the so-called clock dial or face 29.

Figure 7:
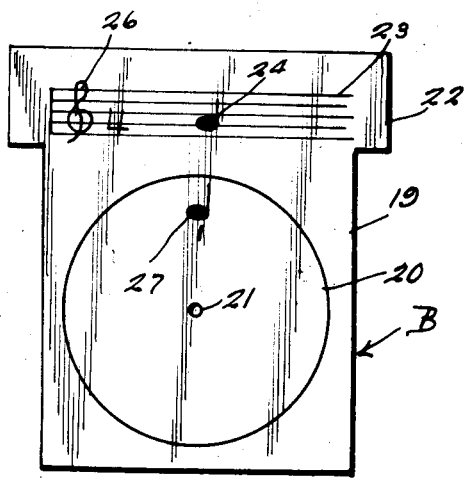
Figure 7 is a view of another chart to show the range of chart ideas, that is, by comparing Figures 6 and 7.

FIRST RHYTHM.—*One tone–one beat (Figure 7)*

In first rhythm one tone receives one beat, the tone being sustained while arrow 18 rotates in clockwise direction from 12 back to 12.

It will be noted both here and on the remaining charts that only the lower figure of the time signature is given, the reason being that we are concentrating on the beat and the fractions thereof; the number of beats in a measure, therefore, is of no consequence.

Figure 6:
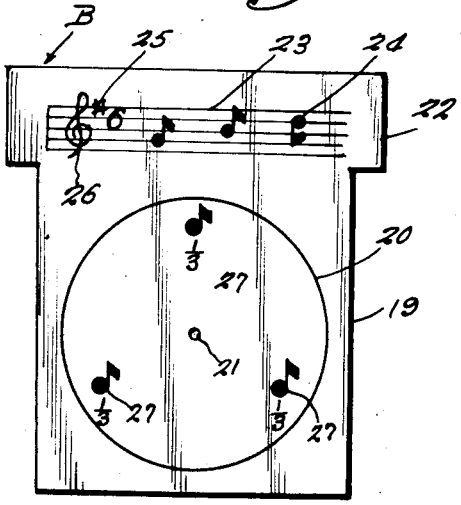
Figure 6 is a detail elevational view of one of the charts per se removed from the holder, this being the same chart which is seen in combination with the holder in Figure 1.

(Figure 6). THIRD RHYTHM.—*Three equal tones–one beat*

In third rhythm three equal tones are sung to one beat; the first is sustained from 12 to twenty minutes past; the second from twenty minutes past to twenty minutes of; the third, from twenty minutes of back to twelve.

Certain points to be noted:

1. The Rhythm Master does what it is supposed to do: it visualizes time.
2. The device is simple and easy of operation.
3. It applies the educational principle of leading from the known to the unknown: from time as represented by the familiar clock face to time in music.
4. Attention is secured and sustained by the movement of the "clock hand."
5. The device is adaptable either to individual or to group teaching.
6. The arithmetic of the beat is clearly seen.
7. The what and the how. The notes are visible in normal position on the staff: the amount of time given to each is clearly illustrated on the clock face.
8. A new or a difficult rhythm can be isolated, drilled upon, and re-incorporated in the original song or exercise.
9. The device may be used by teachers of instrumental music.
10. The device may be used with any music course or with any series of music readers.
11. Storage of charts is provided for.
12. The device is adaptable to other uses in the classroom.

In practice the charts are placed in the frame portion of the holder as shown in Figure 1. In this assemblage the note symbols visible in normal position on the staff 23 in the amount of time given to each is clearly illustrated on the clock face 20. The crank handle 16 is turned in the clockwise direction from one note to the other on the clock dial, whereby to visibly bring to view the result desired.

Figure 8:
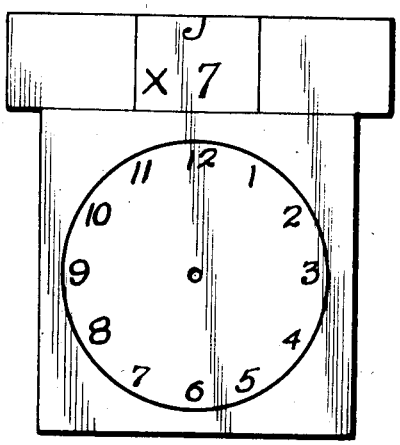

I have said that the device (see Figure 8) is adaptable to other uses in the classroom. It may be used for drill on the fundamental processes in arithmetic. Other charts can be made to fit the individual teacher's need. I shall illustrate only two: mutiplication by 7 and decimal equivalents. The multiplier is clipped to the top of the chart, and the clock hand is swung at will to the various numbers on the clock face. The pupil's answer will be the product of these two factors. This makes it possible for the teacher to repeat easily and often a difficult combination. In this way the one hundred facts in each of the four fundamental processes, addition, subtraction, multiplication, and division can be drilled upon, the moving hand sustaining attention during drill.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having described the invention, what is claimed as new is:

1. A chart of the character described comprising a rectangular panel of dimensions adapting it to be fitted into a frame through an entrance at the upper end of the frame, the front face of said panel being inscribed with a circle simulating a clock dial and symbols within marginal limits of the dial, there being a header across the upper end of said panel for display above the frame, and said header being provided with symbols thereon.

2. A chart of the character described comprising a rectangular panel of dimensions adapting it to be fitted into a frame through an entrance at the top of the frame, said panel having its front face provided with a circle simulating a clock dial and symbols within marginal limits of said dial, and a header extending across the upper end of said panel with end portions projecting from opposite sides of the panel and providing shoulders for resting upon the upper end of the frame and supporting the header above the frame, said header being provided with symbols thereon.

MARY GERTRUDE McGOWAN.